Sept. 21, 1971  M. WEINERT ET AL  3,606,634
WORM EXTRUDERS FOR THE TREATMENT OF SYNTHETIC MATERIALS
Filed Nov. 20, 1968
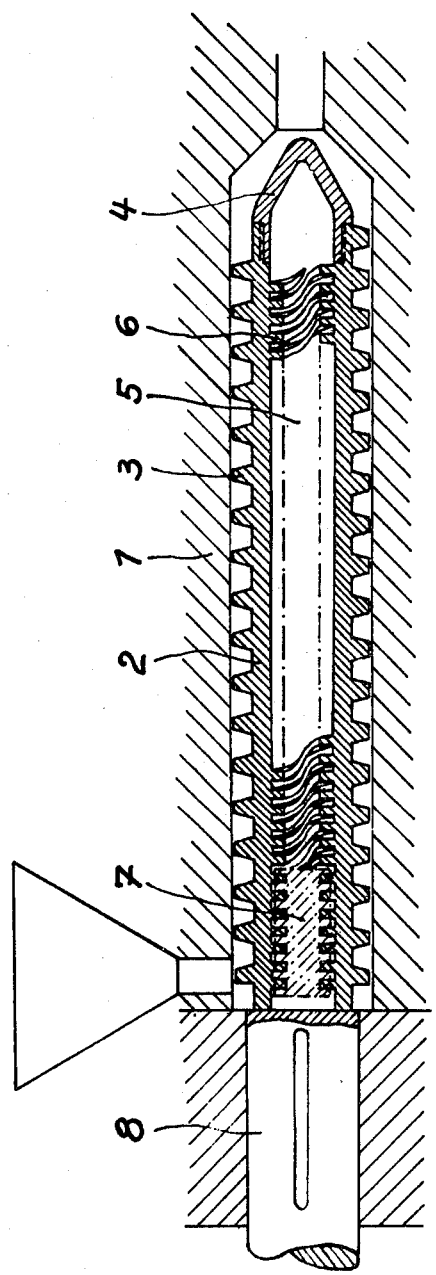
*INVENTORS*
MANFRED WEINERT
KLAUS-PETER FAHNENSTICH
BY Glascock, Downing
& Seebold
ATTORNEYS.

United States Patent Office 3,606,634
Patented Sept. 21, 1971

3,606,634
WORM EXTRUDERS FOR THE TREATMENT OF SYNTHETIC MATERIALS
Manfred Weinert, Metzkausen, Germany, and Klaus-Peter Fahnenstich, Springfield, Vt., assignors to Schloemann Aktiengesellschaft, Dusseldorf, Germany
Filed Nov. 20, 1968, Ser. No. 777,236
Claims priority, application Germany, Nov. 28, 1967, P 17 29 344.6
Int. Cl. B29f 3/02
U.S. Cl. 18—12SM    7 Claims

ABSTRACT OF THE DISCLOSURE

A worm extruder for the treatment of synthetic materials, wherein heat is withdrawn from the part of the worm towards the outlet end by a cooling medium provided in an axial cavity in the worm, this bore being partially filled with the cooling medium at room temperature and at a pressure below atmospheric pressure, so that the cooling liquid is subjected only to its own vapour pressure, the cavity then being hermetically sealed.

Internal screw threads may be provided in the cavity, to impel the liquid towards the tip of the worm when the worm is revolving; and a plug may be adjustably screwed into these internal screw threads to vary the area of the heat-exchange surface.

---

This invention relates to a worm for an extruder for the treatment of synthetic materials, wherein the heat absorbed from the worm section at the discharge end is removed by a cooling medium guided in an axial bore of the worm.

In worm extruders, particularly those of large output, it frequently happens that the worm section at the exit end, that is to say, the head of the worm, becomes excessively heated by friction, which leads to over-heating of the extruded material, and therefore to a deterioration in the quality of the products produced on the press. It is therefore already known to cool the worms of worm extruders by means of gaseous or liquid media, for instance air or water. For this purpose there is machined in the worm, from its rearward end face, an axially extending bore, of the nature of a blind hole, and a cooling medium is admitted into the worm by way of a thin tube mounted co-axially in the bore, in such a way that it first cools the head of the worm, and from there flows back to the foot of the worm. With such a circulation of cooling medium it is possible to withdraw heat, particularly from the tip of the worm. By means of plugs inserted in the bore of the worm, which may be axially displaceable, and by means, it may be, of a plurality of co-axial and concentric inlet tubes of different lengths, the cooling can be controlled, and can be limited to a partial section of the worm. Provision must however here be made for keeping the pressure of the cooling medium always constant, and the temperature of the cooling medium flowing away is preferably continuously noted by thermometers, to enable the quantity of flow and the speed of flow to be regulated according to the operating conditions.

Such cooling devices are expensive, and there is always the risk of leakages at the inlet and outlet connections at the rotating end of the worm. Moreover the rear worm shaft, to which the drive is attached, is weakened by the bore for the flow and return of the cooling medium, which is the more serious inasmuch as the worm shaft has the smallest cross-section of the entire worm. In the case of double-worm and multi-worm presses, the rear end faces of the worm shafts are frequently so obstructed by the driving means and the clutches or couplings, that an inlet or outlet for cooling medium is not possible here at all. Finally it is necessary under some circumstances, particularly in the case of very large extruders, not only to withdraw heat from the tip of the worm, but also, it may be, to supply heat, to other parts of the worm, in the region of the entry zone for example. On this ground extruder worms have also already been built which are provided not only with an internal cooling device but also with a heating device. Worms of this nature, with a cooling and heating system, are of course expensive, being costly both to manufacture and to operate, and are very susceptible to disturbances in operation.

Now the object of this invention is to provide a worm for worm extruders, in which local overheating of the worm head and of the extruded material by friction is obviated, but which also at the same time enables other parts of the worm to be heated. The worm is also simple to manufacture and reliable in operation, and should need no connections leading outwards, and can accordingly be easily and advantageously employed in any double-worm and multiple-worm press.

This result is obtained, according to the invention, by the feature that the worm, in the region of the effective worm threads that are necessary for the treatment of the synthetic material, is made hollow, and the cavity thus provided is partially filled at room temperature, under a reduced pressure, with a cooling liquid under its own vapour pressure, and is then hermetically sealed.

By these measures the result is obtained that the cooling liquid introduced into the cavity in the interior of the worm is vapourized in the warmer outlet end of the worm (the worm tip) during the operation of the extruder, flows rearwards as steam, and there condenses on the cooler wall of the bore, and flows back again as liquid to the tip of the worm. There accordingly already adjusts itself, on the basis of the reduced pressure, even at comparatively low temperatures, during the operation, within the worm, an automatic exchange of heat, which obviates local overheating, but wherein no heat is wasted, and accordingly also no loss occurs. The system, which needs no inlet, outlet or circulating devices, uses on the one hand the cooling action of the synthetic material flowing into the worm cylinders from the filling funnel or hopper, the heat of condensation being on the other hand used at the same time for the more rapid heating of the fresh synthetic material flowing in. Owing to the fact that in the worm according to the invention the circulation of the cooling medium in this process is effected in two phases, that is to say, in one direction in the liquid phase and in the other direction in the vapour phase, very much greater quantities of heat can be transmitted or exchanged than with any other system of exchange.

The worm must however be horizontally supported, in order to ensure that the cooling liquid in the worm cavity can pass continuously right to the tip of the worm. In case of need there may be provided, by a conical worm bore or by an oblique position of the extruder, a slight inclination towards the tip of the worm.

It is advantageous to provide screw threads in the interior of the worm, which are so constructed that they convey the cooling liquid, when the extruder is in operation, as the worm revolves, towards the tip of the worm. These screw threads have the further advantage of acting as cooling ribs, and giving the worm a considerably increased internal surface area. Since the quantities of heat that can at any time be transmitted are proportional to the surfaces available for their transmission, a particularly large transmission of heat can be obtained in this way.

The cooling action occurring at the worm tip in the worm according to the invention may be so great that the issuing synthetic material is under some circumstances cooled down too far. On the other hand it is possible, particularly in single-worm extruders, for the entry zone to become too highly heated, whereby disturbances are liable to occur in the admission of the fresh material. According to a further feature of the invention, therefore, a plug is inserted in the interior of the worm, whereby the cooling zone or, in other words the heat-exchanging chamber, can be shortened to a greater or less extent. The plug itself may consist of metal or of some suitable synthetic material. According to how much of the surface area the plug covers, or according to whether the area covered by the plug is located in the front portion or in the rear portion of the worm, a different pressure of the circulating cooling medium adjusts itself. The higher the pressure rises, the higher does the boiling point of the cooling liquid also rise.

Fundamentally any convenient cooling medium may be employed, in so far as it boils only at the temperature prevailing at the tip of the worm, taking the reduced pressure into consideration. It is particularly simple to use water as the cooling medium. By means of the plug, or, in other words, by the position of the plug, it is possible to shield definite parts of the worm, in the entry zone for instance, or at the tip of the worm, from a direct and unduly intensive exchange of heat. In this way it is possible to adapt the exchange of heat, that is to say, the cooling at the tip of the worm and the supply of heat in the entry zone, to different synthetic materials and to different working conditions.

The sub-atmospheric pressure prevailing in the interior of the worm is preferably so adjusted that the boiling point of the cooling liquid lies at first at about 50° C., so that practically from the start of the operation onwards, an exchange of heat between the worm tip and the entry zone is ensured.

It is desirable that the worm cavity should be filled with cooling liquid to the extent of from 5 to 50 percent of its volume, but preferably between 25 and 30 percent.

In one practical embodiment of a double-worm press, the worms had an external diameter of 100 mm. and a core diameter of 76 mm. The effective length of the worms for the treatment of synthetic material amounted to 900 mm., and the two worms were each bored with a central bore of a diameter of 60 mm., extending to a length of about 800 mm. from the head of the worm. This internal cavity in the worm was filled to the extent of about one-third with water, and was then closed at the end, and evacuated to about 16 torr. The screw threads provided in the interior of the worm were so selected that the water reached the tip of the worm after three revolutions of the worm. Four screw threads were required altogether, the depth of the screw threads amounting to 15 mm. By this measure it was possible to withdraw heat from the tip of the worm, and to distribute it to the worms, to such an extent that the worm tips themselves, even at an output rate of 180 kilogrammes per hour, are not heated to such an extent as to injure the material, whereas without the cooling means according to the invention the output rate had to be limited to 80 kilogrammes per hour, on account of the excessive adiabatic heating of the worm tip. The output of the said double-worm press could accordingly be quite considerably increased without the quality of the product being impaired.

The invention will now be further described, with reference to an embodiment illustrated by way of example in the accompanying drawing, which shows a cross-section through a worm according to the invention.

Inside a worm casing 1, which may be arranged in duplicate for a double-worm extruder, is arranged a worm 2 according to the invention, which, with its worm threads 3, conveys the synthetic material supplied to it at one end in the direction of a worm tip 4, and in so doing plasticises and homogenises it. In the region of the worm threads 3 that are required for the treatment of the synthetic material, the worm is made hollow. The cavity 5 thus provided, which is closed at one end by the worm tip 4 screwed into the worm body 2, is filled to the extent of about one-third with a cooling liquid, and is then evacuated and hermetically sealed.

Furthermore there may advantageously be machined in the cavity 5 screw threads 6, which, as already stated, are so directed that they urge the cooling liquid introduced into the cavity 5, as the worm revolves, towards the head of the worm. Finally, into the screw threads 6, as indicated in dot-and-dash lines in the drawing, plugs 7 are screwed, by which the cavity 5 can be shortened to a greater or smaller extent according to the position of the plug. At the parts of the worm covered by the plug, the exchange of heat becomes smaller, that is to say, when the plug is located in the rear portion of the worm, as repersented in the drawings, the heating of the worm by heat of condensation here becomes less, whereas when the plug is displaced into the tip of the worm, the withdrawal of heat there is throttled by the heat of vapourization. For the adjusting of the plug 7, a thin bore, not shown in the drawing, may extend through the worm shaft 8, and through this bore the plug 7 can be acted upon by means of a rotatable rod. Through such a bore the worm may at the outset be supplied with cooling liquid and evacuated. Provision must of course be made for the fluidtight closure of the bore.

The worm according to the invention, which is designed particularly for double-worm extruders, also admits of being employed for single-worm extruders.

Even when a fine bore is provided in the worm shaft 8 for the adjusting of the plug 7, it must be clearly recognised that the worm shaft 8 must not be seriously weakened. This is of great importance in view of the magnitude of the driving power to be transmitted.

We claim:

1. Apparatus for extruding plastic material, the apparatus comprising a body member having a bore, means for supplying said plastic material to said bore, a screw rotatably mounted in said bore, and means for rotating said screw to advance said material along the bore, said screw including an elongated body portion having a longitudinal bore in which a predetermined amount of heat exchange fluid is encapsulated, a portion of said heat exchange fluid being in the liquid phase at normal temperature and partially filling said bore and means responsive to rotation of said screw for moving said fluid in the bore, the movement including moving the fluid in the liquid phase towards a downstream end of the bore whereby movement of the heat exchange fluid is adapted to modify a temperature gradient occurring along the elongated body portion of the screw on operation of the apparatus.

2. A screw for a screw extruder arranged to extrude plastic material, the screw comprising an elongated body portion having a longitudinal bore in which a predetermined amount of heat exchange fluid is encapsulated, a portion of said heat exchange fluid being in the liquid phase at normal temperature and partially filling said bore, and means responsive to rotation of said screw for moving said fluid in the bore, the movement including moving the fluid in the liquid phase towards a downstream end of the bore, whereby movement of the heat exchange fluid is adapted to modify a temperature gradient occurring along the elongated body portion of the screw on operation of the apparatus.

3. A screw as claimed in claim 2, wherein said means responsive to rotation of said screw include at least one internal helical thread provided on the walls of the bore, whereby on rotation of the screw in the same direction as that of the helical thread the heat exchange fluid in the liquid phase is guided along said helical thread towards the downstream end of the bore.

4. A screw as claimed in claim 2, wherein the bore has sealing means comprising a plug adapted to be sealingly mounted in the bore and means for adjusting the longitudinal position of the plug in the bore whereby the length of the bore in which the heat exchange fluid is encapsulated is adjusted by operation of said adjusting means.

5. A screw as claimed in claim 2, wherein the predetermined amount of heat exchange fluid in the liquid phase at normal temperature in the bore has a volume in the range of 5 to 50 percent of the volume of the bore.

6. A screw as claimed in claim 5, wherein the predetermined amount of heat exchange fluid in the liquid phase at normal temperature in the bore has a volume in the range 25 to 30 percent of the volume of the bore.

7. A screw as claimed in claim 2, wherein the heat exchange fluid is water which is encapsulated in the bore with the vapour pressure above the liquid water reduced substantially below atmospheric pressure, whereby water at the downstream end of the bore is adapted to be vapourized when in contact with portions of the screw having a temperature above the boiling point of the liquid at that vapour pressure to reduce the temperature of said portions.

References Cited

UNITED STATES PATENTS

| | | | |
|---|---|---|---|
| 1,902,295 | 3/1933 | Shook | 18—12(ST) |
| 2,830,104 | 4/1958 | Speckhardt et al. | 18—12(SF) |

FOREIGN PATENTS

| | | | |
|---|---|---|---|
| 1,267,833 | 5/1968 | Germany | 18—12ST |

WILLIAM S. LAWSON, Primary Examiner

U.S. Cl. X.R.

18—12ST, 12SZ